United States Patent
Crombez et al.

(10) Patent No.: US 7,748,792 B2
(45) Date of Patent: Jul. 6, 2010

(54) AUTOMOTIVE BRAKING SYSTEM WITH MASTER CYLINDER FORCE SIMULATOR

(75) Inventors: Dale S. Crombez, Livonia, MI (US); Daniel A. Gabor, Canton, MI (US)

(73) Assignee: Ford Global Technologies, Dearborn, MI (US)

( * ) Notice: Subject to any disclaimer, the term of this patent is extended or adjusted under 35 U.S.C. 154(b) by 429 days.

(21) Appl. No.: 11/761,005

(22) Filed: Jun. 11, 2007

(65) Prior Publication Data
US 2008/0303340 A1 Dec. 11, 2008

(51) Int. Cl.
*B60T 8/34* (2006.01)
(52) U.S. Cl. .................. 303/113.4; 303/115.1
(58) Field of Classification Search ............. 303/113.4, 303/113.3, 10, 11, 3, 114.1, 115.1, 115.2; 74/512
See application file for complete search history.

(56) References Cited

U.S. PATENT DOCUMENTS

| | | | |
|---|---|---|---|
| 4,658,939 A | 4/1987 | Kircher et al. | |
| 5,563,355 A * | 10/1996 | Pluta et al. | 74/512 |
| 5,865,510 A | 2/1999 | Poertzgen et al. | |
| 6,105,737 A | 8/2000 | Weigert et al. | |
| 6,378,671 B1 | 4/2002 | Carlson | |
| 6,412,882 B1 * | 7/2002 | Isono et al. | 303/114.1 |
| 6,471,017 B1 | 10/2002 | Booz et al. | |
| 6,491,141 B1 | 12/2002 | Severinsson | |
| 6,722,480 B2 | 4/2004 | Carlson | |
| 2002/0108463 A1 * | 8/2002 | Shaw et al. | 74/512 |
| 2005/0046273 A1 * | 3/2005 | Jung et al. | 303/113.4 |
| 2006/0071544 A1 * | 4/2006 | Young | 303/113.4 |
| 2006/0087173 A1 | 4/2006 | Kajiyama et al. | |
| 2008/0017425 A1 | 1/2008 | Albrichsfeld et al. | |
| 2008/0196983 A1 | 8/2008 | Von Hayn et al. | |

* cited by examiner

*Primary Examiner*—Melanie Torres Williams
(74) *Attorney, Agent, or Firm*—Jerome R. Drouillard; David Kelley

(57) ABSTRACT

A brake-by-wire automotive braking system includes a master cylinder connected to a number of wheel cylinders, with the master cylinder being actuated by a brake pedal assembly operatively connected with a master cylinder force simulator simulating the resistive force/displacement characteristics of the master cylinder itself. An electronically controlled compliance device selectively immobilizes the master cylinder force simulator so that the resistive force provided by the simulator may be applied selectively to the brake pedal. This produces a transparency in the brake pedal's operational feel, notwithstanding the presence or absence of force provided by the master cylinder force simulator.

10 Claims, 2 Drawing Sheets

AUTOMOTIVE BRAKING SYSTEM WITH MASTER CYLINDER FORCE SIMULATOR

BACKGROUND OF THE INVENTION

1. Field of the Invention

The present invention relates to an automotive braking system having both brake-by-wire and conventional braking capability.

2. Disclosure Information

In automotive brake-by-wire systems, such as those in use with hybrid vehicles having both friction braking and regenerative braking, it is known to provide a pedal feel simulator to replicate the force/displacement response of a conventional hydraulic brake system. Such pedal feel simulator devices are installed in an effort to obtain transparency to the vehicle driver regarding the type of braking mode used by the vehicle at any particular time. In other words, the amount of pedal force required from a motorist to produce a given rate of vehicle deceleration should not change when regenerative braking is present.

In the event that a drive-by-wire portion of a system becomes unavailable, such as is sometimes the case when, for example, a regenerative braking system has fully recharged an energy storage device, or if a braking system impairment limits the ability to provide assisted braking, it is necessary to rely upon the conventional hydraulic brakes. In such case, it is desirable to eliminate the resistive portion of brake pedal force which would otherwise be provided by a pedal feel simulator. This prevents the motorist from having to overcome not only brake pedal force arising from the master cylinder, but also the force arising from the pedal feel simulator.

Known pedal feel simulators typically use electrohydraulic devices to selectively couple the simulator into and out of the braking system. Unfortunately, such electrohydraulic devices offer high first cost and high maintenance costs, and require complicated electronic systems support to assure their continued operation.

It would be desirable to provide a brake-by-wire type of braking system with a simplified and easily controllable pedal feel simulator.

SUMMARY OF THE INVENTION

In a preferred embodiment, an automotive braking system includes a master cylinder connected to a plurality of wheel cylinders, as well as to a brake pedal assembly having a pedal attached to a rotating suspension. The brake pedal is operatively connected with the master cylinder. A master cylinder force simulator is connected with a portion of the rotating suspension upon which the pedal is mounted. The master cylinder force simulator includes a resilient element having a base and a resilient body extending from the base. The resilient body is elastically deformable by the rotating suspension when the pedal is actuated, provided the base of the resilient element is held stationary. This results in the simulation and application of a resistive force/displacement characteristic of the master cylinder to the brake pedal. An electronically controlled compliance device selectively immobilizes the base of the resilient element so that resistive force provided by the resilient element to movement of the brake pedal may be applied selectively to the brake pedal.

In a preferred embodiment, the present system further includes a linear compliance device connected between the brake pedal assembly and the master cylinder.

According to another aspect of the present invention, the present system accommodates both friction braking and regenerative braking.

According to another aspect of a preferred embodiment, the system further includes a motor/generator, connected with at least one road wheel, for providing both tractive effort and regenerative braking, and an energy storage device, connected with the motor/generator, for providing both tractive energy and for storing energy reclaimed during regenerative braking. The system also includes a controller, connected with the motor/generator and with the energy storage device, as well with the electronically controlled compliance device. The controller operates the electronically controlled compliance device such that resistive force will be provided by the resilient element when the motor/generator is being operated regeneratively, but not when braking is being performed by the master cylinder and the wheel cylinders. In other words, the controller is adapted to adjust the linear compliance device extending between the brake pedal and the master cylinder, and to control the electronically controlled compliance device such that the master cylinder may be actuated directly by the brake pedal without resistance from the electronically controlled compliance device.

It is an advantage of a system according to the present invention that transparency of brake pedal effort may be achieved in an automotive vehicle without the need for complicated electrohydraulic coupling devices employed in known pedal feed simulators.

It is an additional advantage of a system according to the present invention that brake pedal effort is minimized during operating modes during which utilization of the conventional brake system is required.

Other advantages, as well as features of the present invention will become apparent to the reader of this specification.

DETAILED DESCRIPTION OF THE PREFERRED EMBODIMENT

Figure 1:
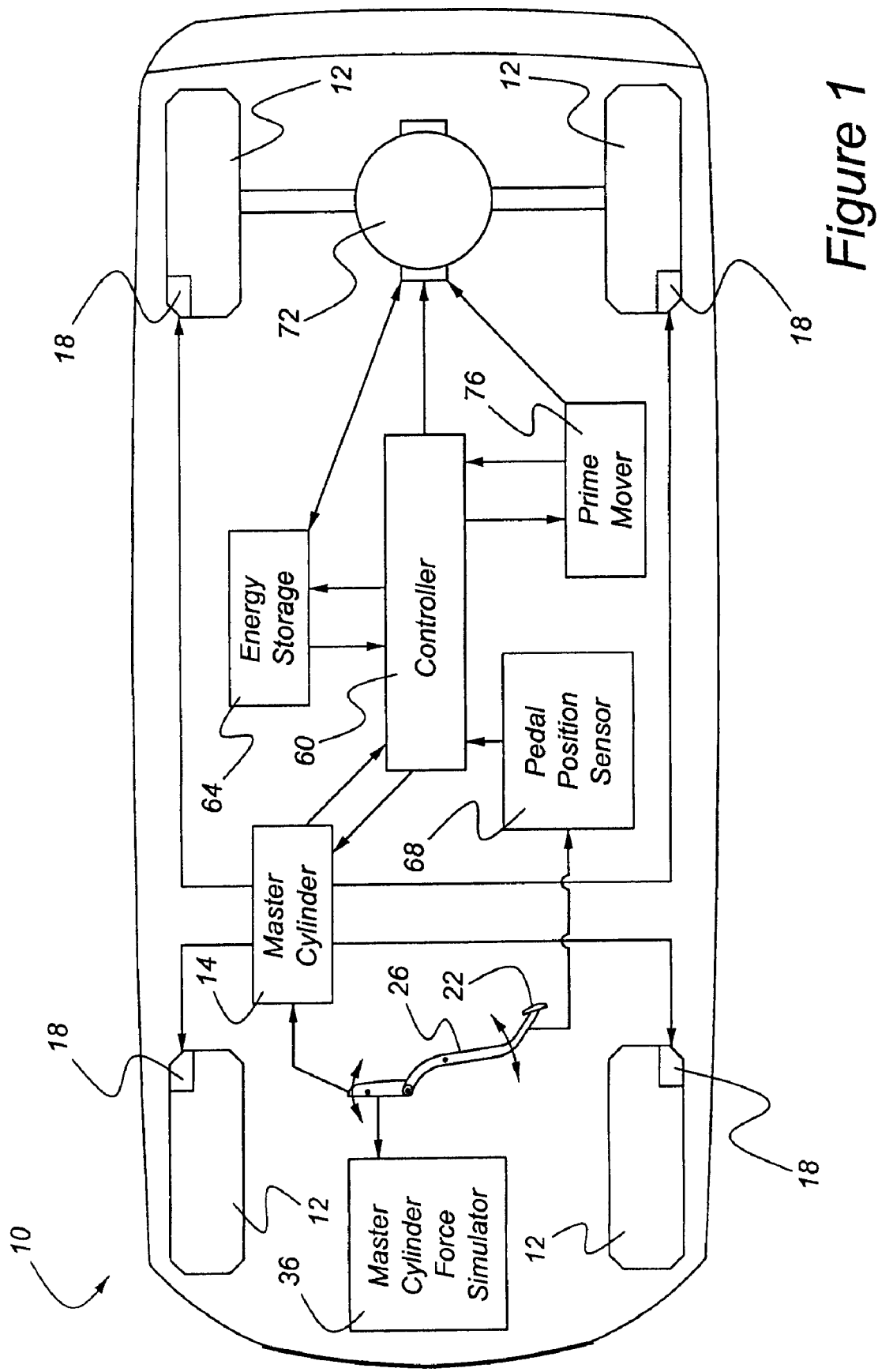
FIG. 1 is a schematic representation of an automotive vehicle having a braking system according to the present invention.
Figure 2:
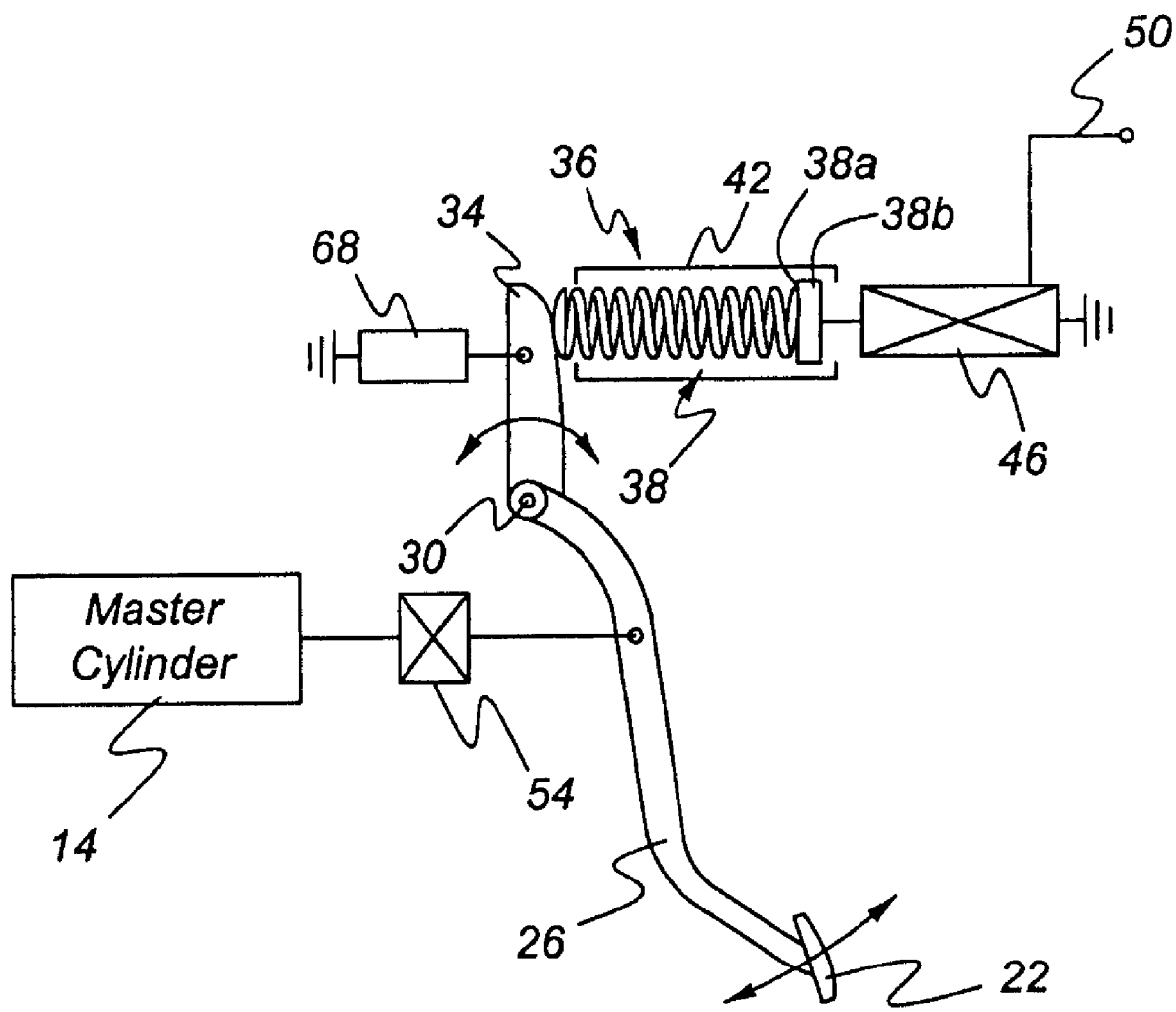
FIG. 2 is a schematic representation of a brake pedal and master cylinder arrangement according to the present invention.

As shown in FIG. 1, vehicle 10 has a number of road wheels, 12, each of which is equipped with a hydraulic brake having a wheel cylinder, 18. Each of wheel cylinders 18 is connected with a master cylinder, 14, which is in turn connected to a system controller, 60. As shown in FIG. 2, master cylinder 14 is operated at least in part by brake pedal 22, which is mounted upon a rotating suspension, including pedal arm 26, which pivots upon pivot 30. Pivot 30 is combined with crank arm 34, which interacts with master cylinder force simulator 36.

Master cylinder force simulator 36 includes resilient element 38, which is mounted for deformation, in the form of elastic compression, within housing 42. As brake pedal 22 is depressed, crank arm 34, which is part of the pedal suspension, compresses resilient body 38*a*. However, for compression of body 38*a* to occur, base 38*b* must be held stationary. Electronically controlled compliance device 46, which is controlled by system controller 60 via control signal 50, (FIG. 1) selectively immobilizes base 38*b* of resilient element 38, and in this manner the resistive force provided by resilient element 38 to movement of brake pedal 22 will be selectively applied to brake pedal 22. Those skilled in the art will appreciate in view of this disclosure that electronically controlled compliance device 46 may be chosen from a class of mechanically or electromagnetically actuated motion control devices such as those illustrated in U.S. Pat. Nos. 6,378,671 and 6,722,480, which are hereby incorporated by reference into this specification. Other devices may be suggested to those skilled in the art by this disclosure.

FIG. 2 also further illustrates a linear compliance device, 54, which is controlled by controller 60, and which decouples pedal arm 26 from master cylinder 14 during normal brake-by-wire operation of vehicle 10. In essence, linear compliance device 54, which is drawn from the class of such devices employed with brake-by-wire systems, allows brake pedal 22 to be selectively depressed without actuating master cylinder 14. Rather, the actuation of master cylinder 14 is handled by controller 60, which monitors the position of brake pedal 22 by means of pedal position sensor 68.

FIG. 1 illustrates additional hardware for use in a hybrid type of vehicle having a prime mover, 76, such as an engine, which is operated by controller 60, and a motor/generator 72, which functions not only for providing tractive effort, but also for regenerative braking. An energy storage device, 64, provides tractive energy and stores energy reclaimed during regenerative braking. Motor/generator 72 may be embodied either as a fluid motor/pump, or an electric motor/generator, or as another type of suitable two-way energy conversion device known to those skilled in the art and suggested by this disclosure. Energy storage device 64 will correspondingly be embodied as a fluid accumulator, or a traction battery, or other suitable energy storage medium.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. An automotive braking system, comprising:
    a master cylinder connected to a plurality of wheel cylinders;
    a brake pedal assembly having a pedal attached to a rotating suspension, with said brake pedal being operatively connected with said master cylinder; and
    a master cylinder force simulator connected with said rotating suspension, with said force simulator comprising:
    a resilient element having a base and a resilient body extending from said base, with said resilient body being elastically deformable by said rotating suspension when said pedal is actuated with said base held stationary, such that a resistive force/displacement characteristic of said master cylinder is simulated and applied to said brake pedal; and
    an electronically controlled compliance device for selectively immobilizing the base of said resilient element, whereby resistive force provided by said resilient element to movement of said brake pedal may be applied selectively to said brake pedal.

2. A braking system according to claim 1, wherein said braking system functions with both friction braking and regenerative braking.

3. A braking system according to claim 1, further comprising a linear compliance device connected between said brake pedal assembly and said master cylinder.

4. A braking system according to claim 1, wherein said electronically controlled compliance device is electro-magnetically actuated.

5. A braking system according to claim 1, wherein said electronically controlled compliance device is mechanically actuated.

6. An automotive braking system having both friction braking and regenerative braking, comprising:
    a hydraulic master cylinder connected to a plurality of friction brake wheel cylinders;
    a brake pedal assembly having a pedal attached to a rotating suspension, with said brake pedal being operatively connected with said master cylinder;
    a linear compliance device connected between said brake pedal assembly and said master cylinder; and
    a master cylinder force simulator connected with said rotating suspension, with said force simulator comprising:
    a resilient element having a base and a resilient body extending from said base, with said resilient body being elastically compressed by said rotating suspension when said pedal is actuated with said base held stationary, such that a resistive force/displacement characteristic of said master cylinder is simulated and applied to said brake pedal; and
    an electronically controlled compliance device for selectively immobilizing the base of said resilient element, whereby resistive force provided by said resilient element to movement of said brake pedal may be applied selectively to said brake pedal.

7. A braking system according to claim 6, further comprising:
    a motor/generator, connected with at least one road wheel, for providing both tractive effort and regenerative braking;
    an energy storage device, connected with said motor/generator, for providing both tractive energy and for storing energy reclaimed during regenerative braking; and
    a controller, connected with said motor/generator, with said energy storage device, and with said electronically controlled compliance device, with said controller operating said electronically controlled compliance device such that said resistive force will be provided by said resilient element when said motor/generator is being operated regeneratively, but not when braking is being performed by said master cylinder and said wheel cylinders.

8. A braking system according to claim 7, wherein said motor/generator comprises a fluid motor/pump, and said energy storage device comprises a fluid accumulator.

9. A braking system according to claim 7, wherein said motor/generator comprises an electric motor/generator, and said energy storage device comprises a traction battery.

10. An automotive brake-by-wire system, comprising:
    a hydraulic master cylinder connected to a plurality of friction brake wheel cylinders;
    a brake pedal assembly having a pedal attached to a rotating suspension, with said brake pedal being operatively connected with said master cylinder;
    a linear compliance device connected between said brake pedal assembly and said master cylinder;
    a master cylinder force simulator connected with said rotating suspension, with said force simulator comprising:
    a resilient element having a base and a resilient body extending from said base, with said resilient body being elastically deformable by said rotating suspension when said pedal is actuated with said base held stationary, such that a resistive force/displacement characteristic of said master cylinder is simulated and applied to said brake pedal; and an electronically controlled, magnetically actuated compliance device for selectively immobilizing the base of said resilient element, whereby resistive force provided by said resilient element to movement of said brake pedal may be applied selectively to said brake pedal;

a brake pedal position sensor; and a controller, operatively connected with said linear compliance device, as well as with said electronically controlled compliance device and said brake pedal position sensor, with said controller adapted to adjust said linear compliance device, and controlling said electronically controlled compliance device such that said master cylinder may be actuated directly by said brake pedal without resistance from said electronically controlled, magnetically actuated compliance device.

* * * * *